US012709180B2

United States Patent
(12) United States Patent
Yang et al.

(10) Patent No.: US 12,709,180 B2
(45) Date of Patent: Aug. 18, 2026

(54) ELECTRIC VEHICLE CHARGING STATION MANAGEMENT METHOD USING BLOCKCHAIN

(71) Applicants: Guochuang Innovation Center of Mobile Energy (Jiangsu) Co., Ltd., Jiangsu (CN); Wanbang Digital Energy Co., Ltd., Jiangsu (CN)

(72) Inventors: Hong-Tzer Yang, Tainan City (TW); Yu-Jin Lin, Tainan City (TW); Danwei Shao, Jiangsu (CN)

(73) Assignees: Guochuang Innovation Center of Mobile Energy (Jiangsu) Co., Ltd., Jiangsu (CN); Wanbang Digital Energy Co., Ltd., Jiangsu (CN)

( * ) Notice: Subject to any disclaimer, the term of this patent is extended or adjusted under 35 U.S.C. 154(b) by 999 days.

(21) Appl. No.: 17/878,929

(22) Filed: Aug. 2, 2022

(65) Prior Publication Data

US 2023/0069004 A1 Mar. 2, 2023

(30) Foreign Application Priority Data

Sep. 1, 2021 (CN) ......................... 202111017866.X

(51) Int. Cl.

*B60L 53/66* (2019.01)
*B60L 53/30* (2019.01)

(Continued)

(52) U.S. Cl.

CPC ........... *B60L 53/665* (2019.02); *B60L 53/305* (2019.02); *B60L 53/51* (2019.02); *B60L 53/53* (2019.02);

(Continued)

(58) Field of Classification Search

CPC ...... B60L 53/665; B60L 53/305; B60L 53/51; B60L 53/53; B60L 53/66; B60L 53/67;

(Continued)

(56) References Cited

U.S. PATENT DOCUMENTS

| | | | | |
|---|---|---|---|---|
| 10,796,371 | B1 * | 10/2020 | Floyd | G07C 5/02 |
| 11,691,534 | B2 * | 7/2023 | Huelz | B60L 53/305 320/109 |

(Continued)

FOREIGN PATENT DOCUMENTS

| | | | |
|---|---|---|---|
| CN | 108334991 | 7/2018 | |
| CN | 109460997 A * | 3/2019 | G06Q 20/145 |

(Continued)

OTHER PUBLICATIONS

Zhang, Fu Bao et al., "Electric Vehicle Charging Chain Based on Blockchain Technology", Compute Technology and Development, vol. 30, No. 4, Apr. 2020, with English translation thereof, pp. 1-18.

(Continued)

*Primary Examiner* — Drew A Dunn
*Assistant Examiner* — Manuel Hernandez
(74) *Attorney, Agent, or Firm* — JCIPRNET

(57) ABSTRACT

An electric vehicle charging station management method using a blockchain includes the following steps: obtaining a maximum charging and a discharging electric power of each electric vehicle in each to-be-planned pane; obtaining a charging and discharging electric power of each electric vehicle in each to-be-planned pane according to electric vehicle information corresponding to the electric vehicle, at least one purchase price, at least one winning bid price, and at least one maximum charging and discharging electric power; determining whether at least one overloaded pane is provided according to a total consumed electric power of a charging station in each time pane; and adjusting the pur- (Continued)

71: Obtaining a total consumed electric power of the charging station in each time pane from the current time pane to the last time pane of the scheduling cycle according to the according to the predicted solar electric power and predicted load power consumption electric power of the charging station in the time pane, the charging electric power or discharging electric power of each electric vehicle in the time pane, and the charging electric power or discharging electric power of the electric energy storage device in the time pane 72: Determining whether at least one overloaded pane is provided in the time pane No Yes 74: Writing the charging electric power or discharging electric power of each electric vehicle and the electric energy storage device in each of the corresponding planned to-be-planned panes without any overloaded pane into the distributed ledger of the blockchain system 73: Adjusting the purchase price of each overloaded pane according to an electricity price adjustment coefficient corresponding to the overloaded pane and repeating step 52, step 62, and steps 71 to 72

75: Controlling the charging station to charge or discharge each electric vehicle and the electric energy storage device in the current time pane according to the charging electric power or discharging electric power corresponding to each electric vehicle and the electric energy storage device in the current time pane according to the charging electric power or discharging electric power of each electric vehicle in each planned time pane without any overloaded pane and the charging electric power or discharging electric power of each electric energy storage device in each corresponding planned to-be-planned pane without any overloaded pane 76: Determining whether the current time pane is the last time pane of the scheduling cycle Yes

END

No

77: Re-executing steps 21 to 22, 31 to 32, 41 to 43, 51 to 52, 62, and 71 to 76 when the time passes to the next time pane of the current time pane chase price of each overloaded pane when it is determined that at least one overloaded pane is provided and re-planning the charging and discharging electric power of the electric vehicle in each to-be-planned pane until it is determined that no overloaded pane is provided.

10 Claims, 5 Drawing Sheets

(51) Int. Cl.

| | |
|---|---|
| ***B60L 53/51*** | (2019.01) |
| ***B60L 53/53*** | (2019.01) |
| ***B60L 53/67*** | (2019.01) |
| ***B60L 53/68*** | (2019.01) |
| ***B60L 55/00*** | (2019.01) |
| ***G05B 13/02*** | (2006.01) |
| ***G06F 1/26*** | (2006.01) |
| ***G06Q 10/02*** | (2012.01) |
| ***G06Q 30/0283*** | (2023.01) |
| ***G06Q 30/08*** | (2012.01) |
| ***G06Q 50/06*** | (2012.01) |
| *H04L 9/00* | (2022.01) |

(52) U.S. Cl.

CPC ............... *B60L 53/66* (2019.02); *B60L 53/67* (2019.02); *B60L 53/68* (2019.02); *B60L 55/00* (2019.02); *G05B 13/02* (2013.01); *G06F 1/26* (2013.01); *G06Q 10/02* (2013.01); *G06Q 30/0283* (2013.01); *G06Q 30/0284* (2013.01); *G06Q 30/08* (2013.01); *G06Q 50/06* (2013.01); *G06Q 2220/00* (2013.01); *G06Q 2220/12* (2013.01); *H04L 9/50* (2022.05)

(58) Field of Classification Search

CPC . B60L 53/68; B60L 55/00; H04L 9/50; G06F 1/26; G05B 13/02; G06Q 10/02; G06Q 50/06; G06Q 30/0283; G06Q 30/0284; G06Q 30/08; G06Q 2220/00; G06Q 2220/12

USPC ........... 320/109; 700/22, 295, 297; 705/400, 705/412

See application file for complete search history.

(56) References Cited

U.S. PATENT DOCUMENTS

| | | | | |
|---|---|---|---|---|
| 2011/0282513 | A1* | 11/2011 | Son | B60L 53/64 700/297 |
| 2012/0005126 | A1* | 1/2012 | Oh | H02J 7/34 705/412 |
| 2012/0259723 | A1* | 10/2012 | Ansari | H02J 3/381 705/26.1 |
| 2014/0184170 | A1* | 7/2014 | Jeong | G06Q 50/06 320/137 |
| 2016/0039301 | A1* | 2/2016 | Igarashi | B60L 53/66 320/157 |
| 2019/0160958 | A1* | 5/2019 | Chaudhary | B60L 53/665 |
| 2020/0111175 | A1* | 4/2020 | Uyeki | B60L 53/67 |
| 2021/0347276 | A1* | 11/2021 | Lu | B60L 55/00 |
| 2022/0219560 | A1* | 7/2022 | Lu | B60L 53/305 |

FOREIGN PATENT DOCUMENTS

| | | | |
|---|---|---|---|
| CN | 110826801 | 2/2020 | |
| CN | 111091224 | 5/2020 | |
| CN | 112491899 A * | 3/2021 | G07F 15/005 |
| EP | 3761255 A1 * | 1/2021 | B60L 53/63 |
| JP | 6516905 | 5/2019 | |

OTHER PUBLICATIONS

"Office Action of China Counterpart Application", with English translation thereof, issued on Oct. 31, 2023, pp. 1-8.

* cited by examiner

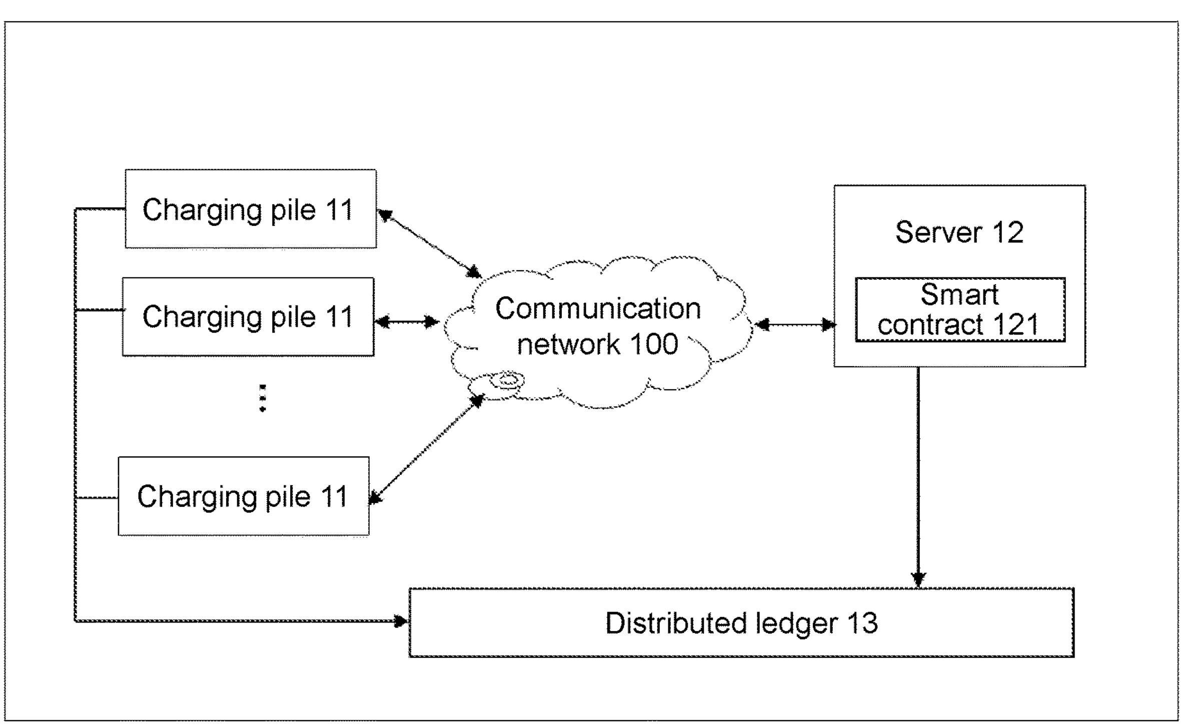

FIG. 1

21: Through a smart contract in a blockchain system, establishing, by using a machine learning algorithm, a power generation prediction model used to predict a power generation status of a solar module of a charging station in a scheduling cycle according to the power generation status of the solar module of the charging station in a previous scheduling cycle earlier than the scheduling cycle according to a plurality of power generation training data

↓

22: Through the smart contract in the blockchain system, predicting, by using the power generation prediction model, a predicted solar electric power corresponding to the solar module in each time pane of the scheduling cycle according to the solar electric power correspondingly generated by the solar module in each time pane of the previous scheduling cycle earlier than the scheduling cycle and weather information corresponding to the scheduling cycle

FIG. 2

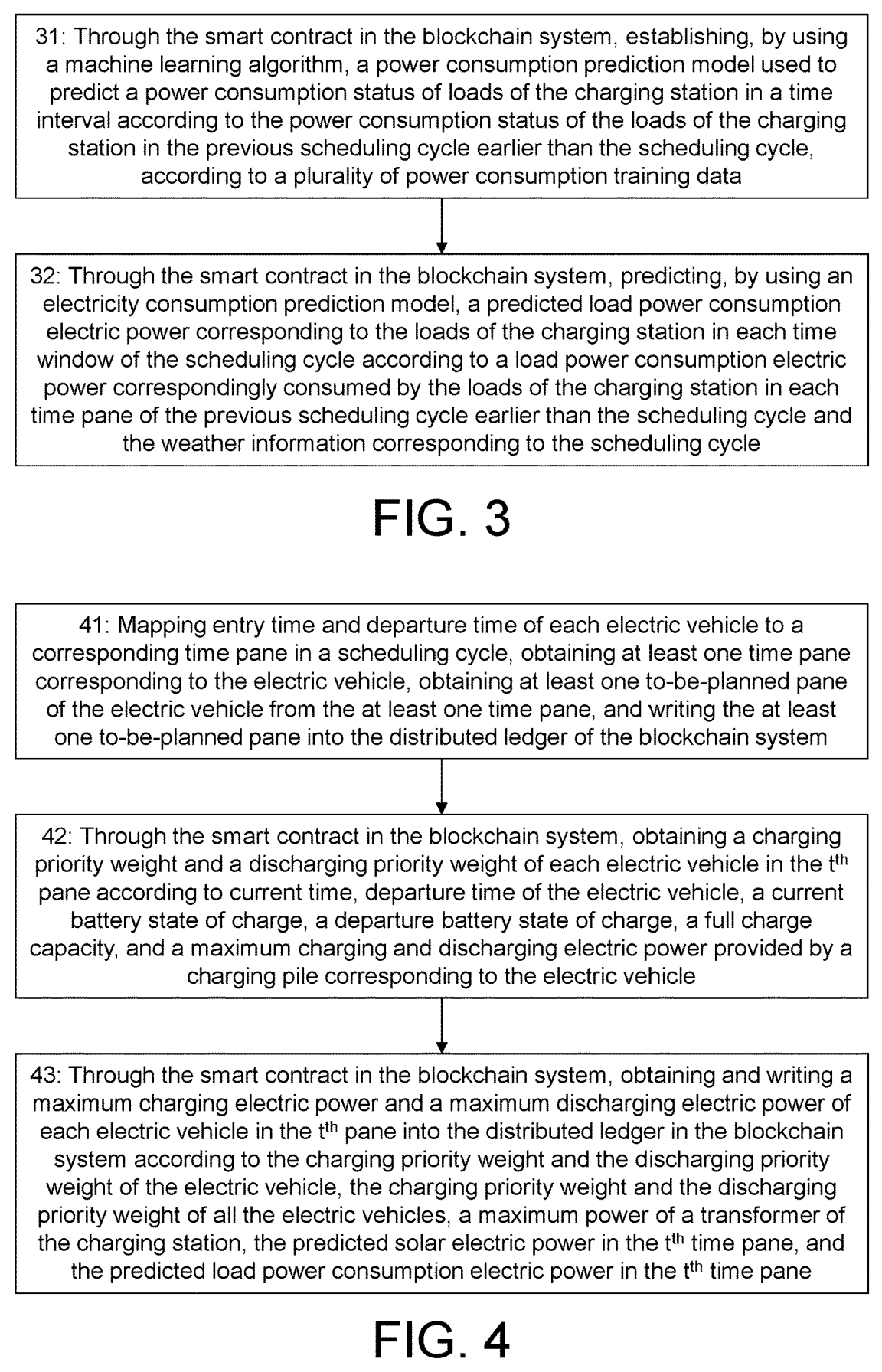

31: Through the smart contract in the blockchain system, establishing, by using a machine learning algorithm, a power consumption prediction model used to predict a power consumption status of loads of the charging station in a time interval according to the power consumption status of the loads of the charging station in the previous scheduling cycle earlier than the scheduling cycle, according to a plurality of power consumption training data

↓

32: Through the smart contract in the blockchain system, predicting, by using an electricity consumption prediction model, a predicted load power consumption electric power corresponding to the loads of the charging station in each time window of the scheduling cycle according to a load power consumption electric power correspondingly consumed by the loads of the charging station in each time pane of the previous scheduling cycle earlier than the scheduling cycle and the weather information corresponding to the scheduling cycle

FIG. 3

41: Mapping entry time and departure time of each electric vehicle to a corresponding time pane in a scheduling cycle, obtaining at least one time pane corresponding to the electric vehicle, obtaining at least one to-be-planned pane of the electric vehicle from the at least one time pane, and writing the at least one to-be-planned pane into the distributed ledger of the blockchain system

↓

42: Through the smart contract in the blockchain system, obtaining a charging priority weight and a discharging priority weight of each electric vehicle in the $t^{th}$ pane according to current time, departure time of the electric vehicle, a current battery state of charge, a departure battery state of charge, a full charge capacity, and a maximum charging and discharging electric power provided by a charging pile corresponding to the electric vehicle

↓

43: Through the smart contract in the blockchain system, obtaining and writing a maximum charging electric power and a maximum discharging electric power of each electric vehicle in the $t^{th}$ pane into the distributed ledger in the blockchain system according to the charging priority weight and the discharging priority weight of the electric vehicle, the charging priority weight and the discharging priority weight of all the electric vehicles, a maximum power of a transformer of the charging station, the predicted solar electric power in the $t^{th}$ time pane, and the predicted load power consumption electric power in the $t^{th}$ time pane

FIG. 4

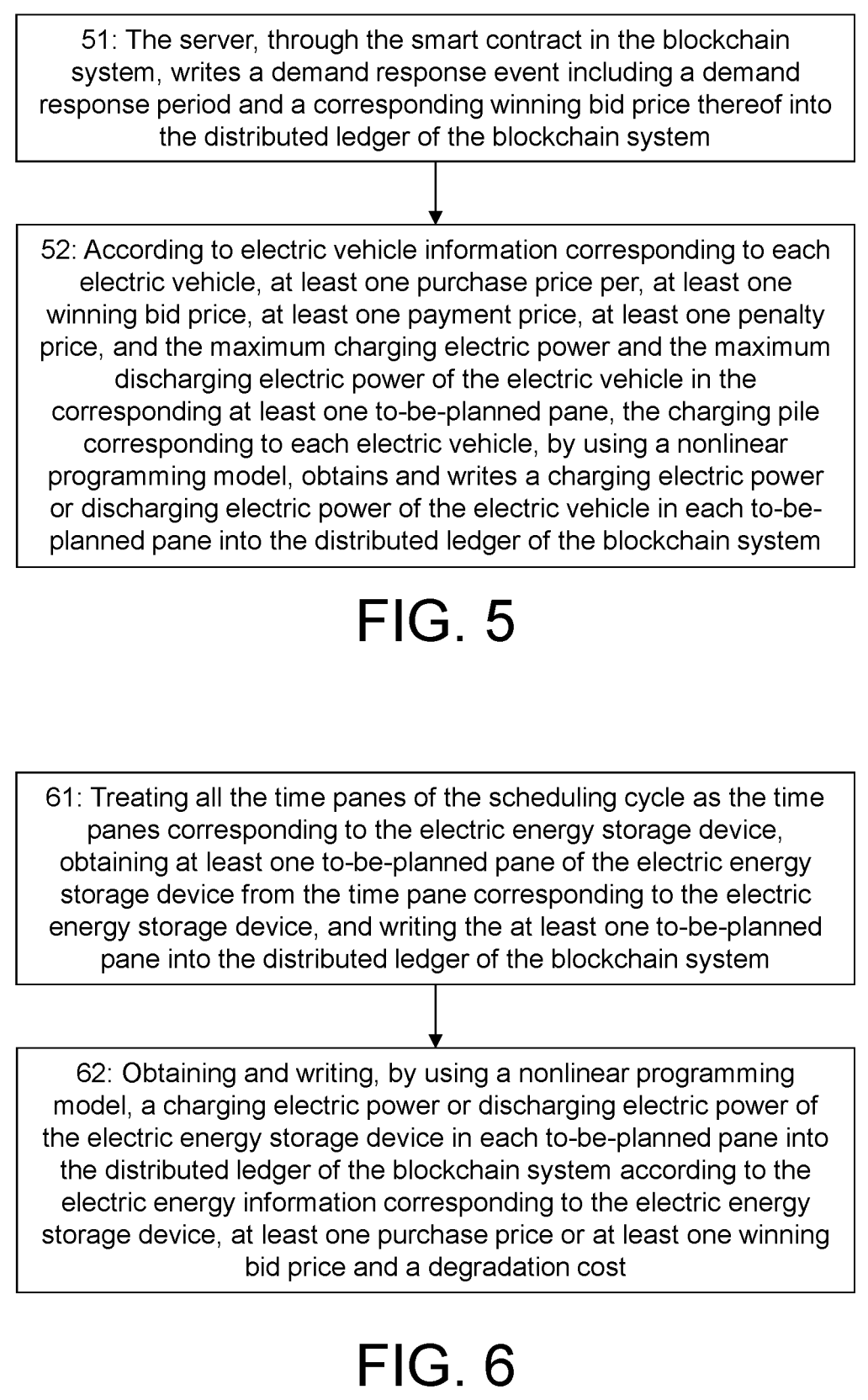

51: The server, through the smart contract in the blockchain system, writes a demand response event including a demand response period and a corresponding winning bid price thereof into the distributed ledger of the blockchain system 52: According to electric vehicle information corresponding to each electric vehicle, at least one purchase price per, at least one winning bid price, at least one payment price, at least one penalty price, and the maximum charging electric power and the maximum discharging electric power of the electric vehicle in the corresponding at least one to-be-planned pane, the charging pile corresponding to each electric vehicle, by using a nonlinear programming model, obtains and writes a charging electric power or discharging electric power of the electric vehicle in each to-be-planned pane into the distributed ledger of the blockchain system

FIG. 5

61: Treating all the time panes of the scheduling cycle as the time panes corresponding to the electric energy storage device, obtaining at least one to-be-planned pane of the electric energy storage device from the time pane corresponding to the electric energy storage device, and writing the at least one to-be-planned pane into the distributed ledger of the blockchain system 62: Obtaining and writing, by using a nonlinear programming model, a charging electric power or discharging electric power of the electric energy storage device in each to-be-planned pane into the distributed ledger of the blockchain system according to the electric energy information corresponding to the electric energy storage device, at least one purchase price or at least one winning bid price and a degradation cost

FIG. 6

71: Obtaining a total consumed electric power of the charging station in each time pane from the current time pane to the last time pane of the scheduling cycle according to the according to the predicted solar electric power and predicted load power consumption electric power of the charging station in the time pane, the charging electric power or discharging electric power of each electric vehicle in the time pane, and the charging electric power or discharging electric power of the electric energy storage device in the time pane

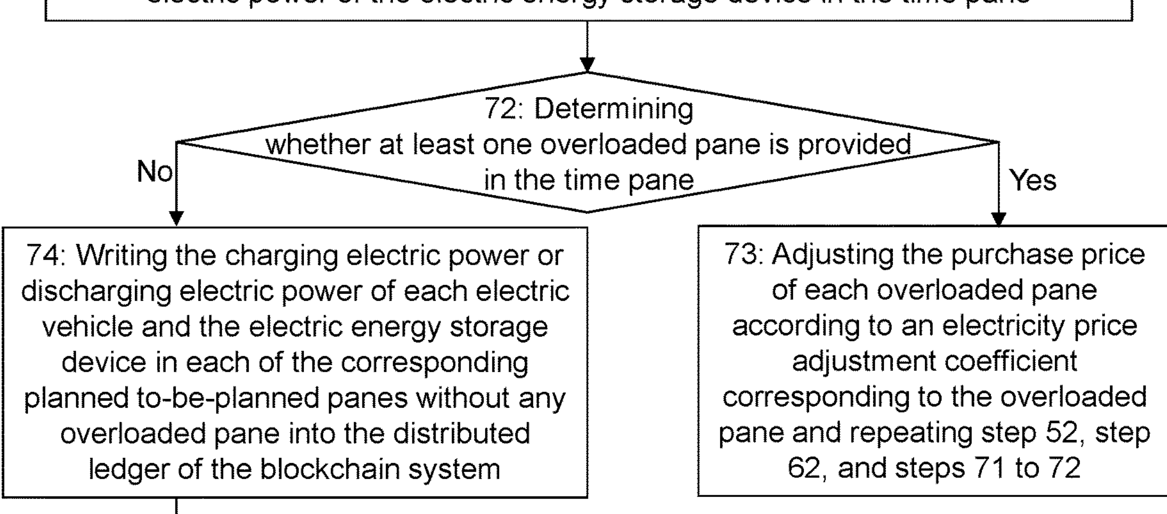

75: Controlling the charging station to charge or discharge each electric vehicle and the electric energy storage device in the current time pane according to the charging electric power or discharging electric power corresponding to each electric vehicle and the electric energy storage device in the current time pane according to the charging electric power or discharging electric power of each electric vehicle in each planned time pane without any overloaded pane and the charging electric power or discharging electric power of each electric energy storage device in each corresponding planned to-be-planned pane without any overloaded pane

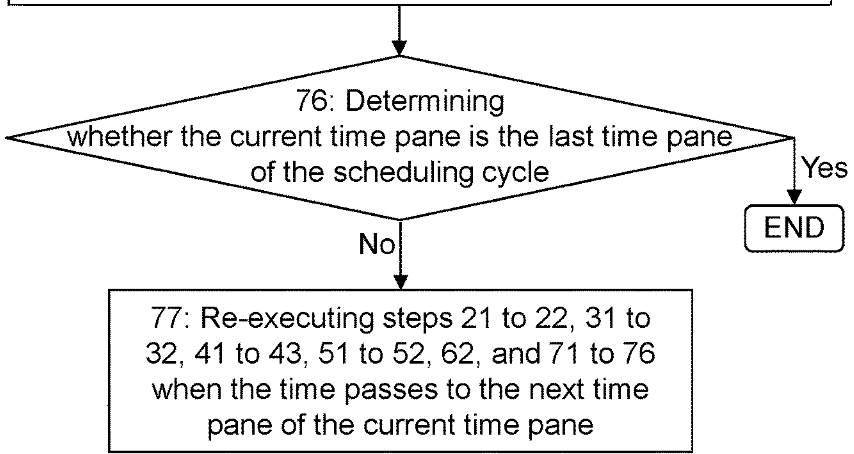

FIG. 7

ELECTRIC VEHICLE CHARGING STATION MANAGEMENT METHOD USING BLOCKCHAIN

CROSS-REFERENCE TO RELATED APPLICATIONS

This application claims the priority benefit of China application serial no. 202111017866.X, filed on Sep. 1, 2021. The entirety of the above-mentioned patent application is hereby incorporated by reference herein and made a part of this specification.

BACKGROUND

Technical Field

The disclosure relates to an electric energy management method of an electric vehicle charging station, and in particular, to an electric vehicle charging station management method using a blockchain system to manage the charging and discharging schedule of each electric vehicle.

Description of Related Art

In response to global warming issues, car makers around the world have begun to develop electric vehicles to replace traditional fossil fuel engines. However, the charging status of electric vehicles can be unpredictable due to different user habits. If all electric vehicles are charged at the same time during peak hours of electricity consumption, it may cause the peak load to be excessively high and then lead to the problem of low standby capacity. Further, the electricity cost for charging during peak hours is relatively high, so the power management of electric vehicle charging stations is a problem that needs to be urgently solved.

After a car owner parks his/her electric vehicle at the charging station, in the electric vehicle charging and discharging scheduling method provided by the related art, the charging and discharging strategy of the electric vehicle is established according to the current state of charge of the electric vehicle, the electricity price, the expected state of charge, and the power grid demand. However, in this method, the scheduling manner is not transparent, and it is impossible to verify whether the electric vehicle is actually charged and discharged according to the scheduled scheduling result, so a solution is needed.

SUMMARY

The purpose of the disclosure is to provide an electric vehicle charging station management method featuring a transparent scheduling manner and ensuring that the electric vehicle charging and discharging are managed according to the planned scheduling result.

To achieve the purpose of the disclosure, the disclosure provides an electric vehicle charging station management method using a blockchain, and in the method, charging and discharging management of a plurality of electric vehicles parked at a charging station is implemented by using a blockchain system. The blockchain system includes a server and a plurality of charging piles disposed in the charging station and in communication with the server. Each electric vehicle corresponds to a piece of electric vehicle information stored in a distributed ledger of the blockchain system and is electrically connected to a corresponding one of the plurality of charging piles. The electric vehicle information includes entry time, departure time, a battery state of charge at the time of entry, a current battery state of charge, an expected departure battery state of charge, a minimum battery state of charge, a maximum battery state of charge, and a full charge capacity of the electric vehicle.

The electric vehicle charging station management method using the blockchain specifically includes the following steps.

(A) The entry time and departure time of each electric vehicle are mapped to a corresponding time pane in a scheduling cycle, at least one time pane corresponding to the electric vehicle is obtained, and at least one to-be-planned pane of the electric vehicle is obtained from the at least one time pane and written into the distributed ledger of the blockchain system. The at least one to-be-planned pane includes each time pane from a current time pane to a last time pane corresponding to the electric vehicle.

(B) A charging priority weight and a discharging priority weight of each electric vehicle in each to-be-planned pane are obtained according to the current time, the departure time of the electric vehicle, the current battery state of charge, the departure battery state of charge, the full charge capacity, and a maximum charging and discharging electric power provided by the charging pile corresponding to the electric vehicle.

(C) A maximum charging electric power and a maximum discharging electric power of each electric vehicle in each to-be-planned pane are obtained and written into the distributed ledger in the blockchain system according to a maximum power of a transformer of the charging station and the charging priority weight and the discharging priority weight of the electric vehicle in each to-be-planned pane the maximum charging electric power and the maximum discharging electric power.

(D) By using a nonlinear programming model, a charging electric power or discharging electric power of each electric vehicle in each to-be-planned pane are obtained and written into the distributed ledger of the blockchain system according to the electric vehicle information of the electric vehicle, at least one purchase price per unit electric power purchased by the charging station in each to-be-planned pane, at least one winning bid price paid by the charing station for participating in demand bidding in each to-be-planned pane, a payment price per unit electric power paid by the charging station in each to-be-planned pane, a penalty price per unit electric power paid by the charging station when the electric vehicle is not fully charged, and the maximum charging electric power and the maximum discharging electric power of the electric vehicle in each to-be-planned pane.

(E) A total consumed electric power of the charging station in each time pane from the current time pane to the last time pane of the scheduling cycle is obtained according to the charging electric power or discharging electric power of each electric vehicle in each to-be-planned pane.

(F) Whether at least one overloaded pane is provided from the current time pane to the last time pane of the scheduling cycle is determined according to the total consumed electric power of each time pane obtained in the step (E) and a maximum supplied electric power of the charging station. The total consumed electric power of the at least one overloaded pane is greater than the maximum supplied electric power of the charging station.

(G) A purchase price of each of the at least one overloaded pane is adjusted when it is determined that at least one overloaded pane is provided, steps (D) to (F) are repeated until it is determined that no overloaded pane is provided, and the currently obtained charging electric power or discharging electric power of each electric vehicle in each to-be-planned pane is written into the distributed ledger of the blockchain system.

Beneficial effects provided by the disclosure include the following.

The electric vehicle charging station management method provided by the disclosure is implemented by using a blockchain system. The charging electric power and the discharging electric power of each electric vehicle in each to-be-planned pane are obtained and written into the distributed ledger according to the electric vehicle information of the electric vehicle, the purchase price per unit electric power purchased by the charging station in each to-be-planned pane of the electric vehicle, the winning bid price paid by the charging station for participating in the demand bidding in each to-be-planned pane of the electric vehicle, and the maximum charging electric power and the maximum discharging electric power of the electric vehicle in each to-be-planned pane. Whether at least one overloaded pane is provided is determined according to the total consumed electric power of the charging station in each time pane. The purchase price of each overloaded pane is adjusted when it is determined that at least one overloaded pane is provided, and the charging and discharging electric power of the electric vehicle in each to-be-planned pane is re-planned until it is determined that no overloaded pane is provided. In this way, the scheduling manner is ensured to be transparent, and the charging and discharging of each electric vehicle is managed according to the planned scheduling result.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 1 is a block diagram of a blockchain system according to an embodiment of the disclosure.

FIG. 2 is a flow chart of power generation prediction according to an embodiment of the disclosure.

FIG. 3 is a flow chart of power consumption prediction according to an embodiment of the disclosure.

FIG. 4 is a flow chart of charging and discharging allocation according to an embodiment of the disclosure.

FIG. 5 is a flow chart of distributed scheduling of electric vehicles according to an embodiment of the disclosure.

FIG. 6 is a flow chart of scheduling of an electric energy storage device according to an embodiment of the disclosure.

FIG. 7 is a flow chart of a comprehensive planning according to an embodiment of the disclosure.

DESCRIPTION OF THE EMBODIMENTS

Figure 8:
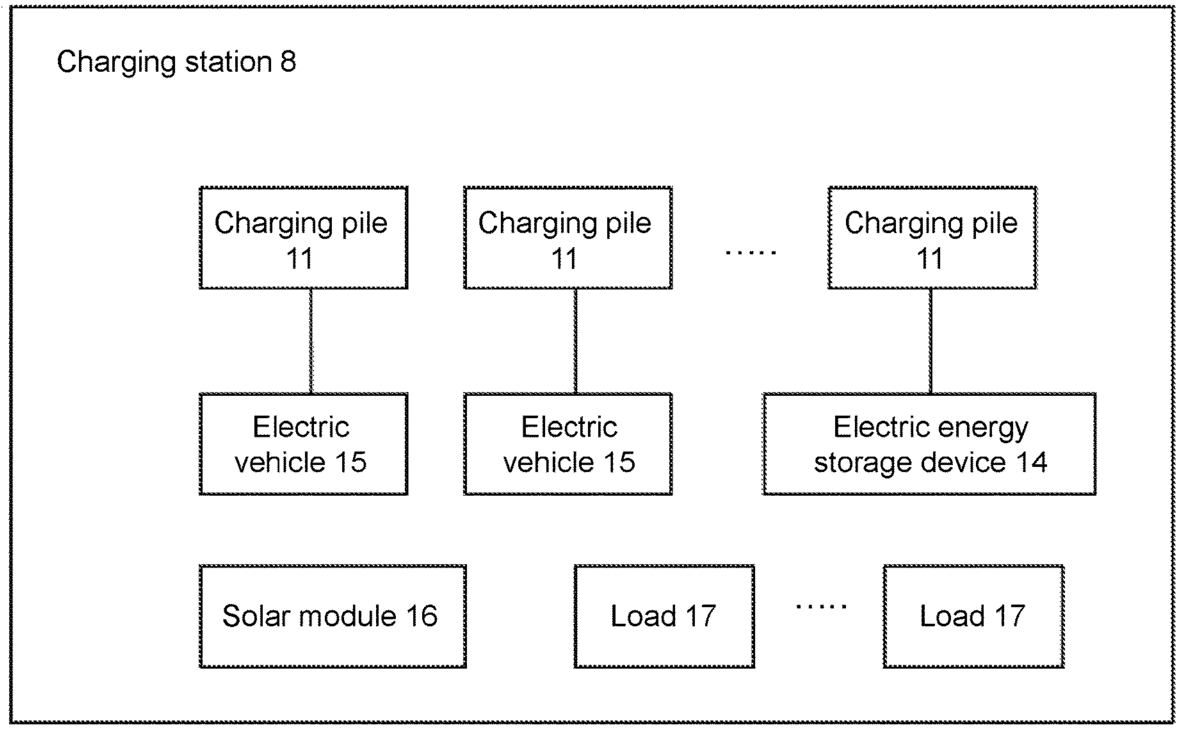
FIG. 8 is a schematic structural diagram of a charging station according to an embodiment of the disclosure.

As shown in FIG. 1 and FIG. 8, the present embodiment provides an electric vehicle charging station management method using a blockchain suitable for managing the charging and discharging states of all electric vehicles 15 parked at a charging station 8 and implemented by a blockchain system 1.

The charging station 8 is provided with an electric energy storage device 14 for storing electric energy, a solar module 16 for generating electricity, a plurality of loads 17, and a plurality of charging piles 11. The electric energy storage device 14 is, for example, an energy storage system (ESS for short). The electric energy storage device 14 is electrically connected to a corresponding one of the plurality of charging piles 11 and corresponds to a piece of electric energy information stored in a distributed ledger 13 of the blockchain system 1. The electric energy information includes an entry battery state of charge, a current battery state of charge, a minimum state of charge, a maximum state of charge, a full charge capacity, and a maximum charging and discharging electric power of the electric energy storage device 14. The solar module 16 includes, for example, a solar cell template, and is used to generate a solar electric power for each time pane in a scheduling cycle. Each electric vehicle 15 is electrically connected to a corresponding one of the plurality of charging piles 11 and corresponds to a piece of electric vehicle information stored in the distributed ledger 13 of the blockchain system 1. Each piece of the electric vehicle information comprises entry time, departure time, a battery state of charge at the time of entry, an expected departure battery state of charge, a current battery state of charge, a minimum battery state of charge, a maximum battery state of charge, and a full charge capacity of the corresponding electric vehicle 15. Each charging pile 11 has computing processing capability and can control charging and discharging of devices electrically connected to it.

The blockchain system 1 includes the plurality of charging piles 11, and a server 12 connected to the plurality of charging piles 11 via a communication network 100. Both the server 12 and the plurality of charging piles 11 are blockchain nodes in the blockchain system 1. In this embodiment, the server 12 may be implemented as personal computer, a notebook computer, a server computer, or a cloud server. A smart contract 121 of the blockchain system runs in the server 12 for executing the steps of the electric vehicle charging station management method using the blockchain provided by the disclosure.

It is worth mentioning that the entry time, the departure time, the entry battery state of charge, departure battery state of charge, the minimum battery state of charge, the maximum battery state of charge, and the full charge capacity included in the electric vehicle information may be generated by the user of the corresponding electric vehicle 15 using a user terminal (not shown) to perform an input operation and may be transmitted to the server 12 of the blockchain system 1 via the communication network 100. The entry battery state of charge and the current battery state of charge included in the electric vehicle information may be obtained by measuring the state of charge of the battery of the electric vehicle through the charging pile 11 electrically connected to the corresponding electric vehicle and then transmitting it to the server 12, but it is not limited thereto. The entry battery state of charge, the minimum state of charge, the maximum state of charge, the full charge capacity, and a maximum charging and discharging electric power included in the electric energy information may be generated by an input operation of a management terminal (not shown) held by the administrator of the charging station 8 and is transmitted to the server 12 of the blockchain system 1 via the communication network 100. The entry battery state of charge and the current battery state of charge included in the electric energy information may be obtained by measuring the state of charge of the battery of the electric energy storage device 14 through the charging pile 11 electrically connected to the electric energy storage device 14 and then transmitting it to the server 12, but it is not limited thereto.

Embodiments of the electric vehicle charging station management method using the blockchain provided by the disclosure are to be described in detail below with reference to the accompanying drawings. The method of this embodiment sequentially includes a power generation prediction process, a power consumption prediction process, a charging and discharging allocation process, an electric vehicle distributed scheduling process, an electric energy storage device scheduling process, and a comprehensive planning process.

With reference to FIG. 1, FIG. 2, and FIG. 8, the power generation prediction process of the electric vehicle charging station management method using the blockchain illustrates how to predict the power generation status of the solar module 16 of the charging station, and the following steps are included.

In step 21, the server 12, through the smart contract 121, establishes a power generation prediction model (which may be implemented by various types of existing neural network models) by using a machine learning algorithm according to a plurality of power generation training data. The power generation prediction model is used to predict the power generation status of the solar module 16 of the charging station 8 in a scheduling cycle according to the power generation status of the solar module 16 of the charging station 8 in a previous scheduling cycle earlier than the scheduling cycle. Each power generation training data includes the solar electric power generated by the solar module 16 of the charging station 8 corresponding to each time pane of the previous scheduling cycle, the weather information corresponding to a time interval, and the solar electric power generated by the solar module 16 of the charging station 8 in each time pane of the scheduling cycle. The input data of the power generation prediction model is historical solar power generation power and weather forecast information, and the output data is the solar electric power generated corresponding to each time pane of the scheduling cycle.

In step 22, the server 12, through the smart contract 121, predicts a predicted solar electric power corresponding to the solar module 16 in each time pane of the scheduling cycle by using the power generation prediction model according to the solar electric power correspondingly generated by the solar module 16 in each time pane of the previous scheduling cycle and the weather information corresponding to the scheduling cycle.

With reference to FIG. 1, FIG. 3, and FIG. 8, the power consumption prediction process of the electric vehicle charging station management method using the blockchain illustrates how to predict the power consumption status of the loads of the charging station, and the following steps are included.

In step 31, the server 12, through the smart contract 121, establishes a power consumption prediction model (which may be implemented by various types of existing neural network models) by using a machine learning algorithm according to a plurality of power consumption training data. The power consumption prediction model is used to predict the power consumption status of the loads of the charging station 8 in the time interval according to the power consumption status of the loads of the charging station 8 in the previous time interval. Each piece of power consumption training data includes the consumed load power consumption electric power corresponding to the loads of the charging station 8 in each time pane of the previous scheduling cycle, the weather information corresponding to the previous scheduling cycle, and the consumed load power consumption electric power corresponding to the loads of the charging station 8 in each time pane of the scheduling cycle. The input data of the power consumption prediction model is historical load power consumption electric power and weather forecast information, and the output data is the consumed load power consumption electric power corresponding to each time pane of the scheduling cycle.

In step 32, the server 12, through the smart contract 12, uses the power consumption prediction model to predict the predicted load power consumption electric power corresponding to the loads of the charging station 8 in each time pane of the scheduling cycle according to the consumed load power consumption electric power corresponding to the loads of the charging station 8 in each time pane of the scheduling cycle and the weather information corresponding to the scheduling cycle.

With reference to FIG. 1, FIG. 4, and FIG. 8, the charging and discharging allocation process of the electric vehicle charging station management method using the blockchain illustrates how to allocate the maximum charging electric power and the maximum discharging electric power corresponding to each electric vehicle 15, and the following steps are included.

In step 41, the charging pile 11 corresponding to each electric vehicle 15 (i.e., the $n^{th}$ electric vehicle 15) maps the entry time $$t_n^{arr}$$

and departure time $$t_n^{dep}$$

of the electric vehicle 15 to a corresponding time pane in a scheduling cycle, obtains at least one time pane corresponding to the electric vehicle, obtains at least one to-be-planned pane of the electric vehicle 15 from the at least one time pane, and writes the at least one to-be-planned pane into the distributed ledger 13 of the blockchain system 1. The at least one to-be-planned pane includes each time pane from a current time pane to a last time pane corresponding to the electric vehicle 15. In this embodiment, the scheduling cycle is, for example, one day, and one time pane is 0.25 hours, then the scheduling cycle is divided into 96 time panes.

In step 42, according to the current time $t^{current}$, the departure time $$t_n^{dep}$$

in the electric vehicle information corresponding to each electric vehicle 15 (i.e., the $n^{th}$ electric vehicle 15), the current battery state of charge $$SOC_n^{current},$$

the departure battery state of charge $$SOC_n^{final},$$

the full charge capacity $$B_n^{cap},$$

and the maximum charging and discharging electric power $$P_n^{max}$$

that can be provided by the charging pile 11 corresponding to the electric vehicle 15, the server 12, through the smart contract 121, obtains the charging priority weight $$pri_{t,n}^{ch}$$

and discharging priority weight $$pri_{t,n}^{disch}$$

of the $n^{th}$ electric vehicle 15 through the following formulas (1) to (2):

$$pri_{t,n}^{ch} = \frac{\left(SOC_n^{final} - SOC_n^{current}\right) \times B_n^{cap}}{\left(t_n^{dep} - t^{current} + 1\right) \times \Delta t \times P_n^{max}} \tag{1}$$

and $$pri_{t,n}^{disch} = \frac{1}{pri_{t,n}^{ch}}, \tag{2}$$

where Δt is a time period corresponding to one time pane, and its unit is hour. In this embodiment, one time pane is defined as 15 minutes, that is, 0.25 hours, so the value of Δt is 0.25.

In step 43, according to the charging priority weight $$pri_{t,n}^{ch}$$

and the discharging priority weight $$pri_{t,n}^{disch}$$

of each electric vehicle 15 (i.e., the $n^{th}$ electric vehicle), the charging priority weight and the discharging priority weight of all electric vehicles 15, the maximum power $$P_{tr}^{max}$$

of the transformer of the charging station 8, the predicted solar electric power $p_{pv,t}$ in the $t^{th}$ time pane, and the predicted load power consumption electric power $p_{load,t}$ in the $t^{th}$ time pane, the server 12, through the smart contract 121, obtains and writes into the distributed ledger 13 of the blockchain system 1 the maximum charging electric power $$p_{EV,n,t}^{ch\_max}$$

and the maximum discharging electric power $$p_{EV,n,t}^{disch\_max}$$

of the electric vehicle 15 in the $t^{th}$ time pane through the following formulas (3-1) to (3-2):

$$p_{EV,n,t}^{ch\_max} = \left(-P_{tr}^{max} + p_{load,t} - p_{pv,t}\right) \times \frac{pri_{t,n}^{ch}}{\sum_n^N pri_{t,n}^{ch}} \tag{3-1}$$

and $$p_{EV,n,t}^{disch\_max} = \left(P_{tr}^{max} + p_{load,t} - p_{pv,t}\right) \times \frac{pri_{t,n}^{disch}}{\sum_n^N pri_{t,n}^{disch}}, \tag{3-2}$$

where N is the number of all electric vehicles 15.

With reference to FIG. 1, FIG. 5, and FIG. 8, the electric vehicle distributed scheduling process of the electric vehicle charging station management method using the blockchain illustrates how to optimize the charging and discharging schedule corresponding to each electric vehicle 15, and the following steps are included.

In step 51, the server 12, through the smart contract 121, writes a demand response event including a demand response period and a corresponding winning bid price thereof into the distributed ledger 13 of the blockchain system 1.

In step 52, according to the electric vehicle information corresponding to each electric vehicle 15 (i.e., the $n^{th}$ electric vehicle), the purchase price per unit electric power purchased by the charging station 8 in each to-be-planned pane of the electric vehicle 15 (i.e., the purchase price of 1 kWh of electricity), the winning bid price (i.e., the winning bid price of 1 kWh of electricity) paid by the charging station 8 for participating in the demand bidding in each to-be-planned pane of the electric vehicle 15 obtained from the distributed ledger 13, a payment price per unit electric power paid by the charging station 8 in each to-be-planned pane of the electric vehicle 15, a penalty price per unit electric power paid by the charging station 8 when the electric vehicle 15 is not fully charged, and the maximum charging electric power and the maximum discharging electric power of the electric vehicle 15 in each to-be-planned pane obtained from the distributed ledger 13, the charging pile 11 corresponding to the electric vehicle 15, by using a nonlinear programming model, obtains and writes a charging electric power or discharging electric power of the electric vehicle 15 in each to-be-planned pane into the distributed ledger 13 of the blockchain system 1.

The objective function of the nonlinear programming model can be expressed as the following formula (4), and the restriction conditions that the objective function satisfies are the following restriction condition 1 to restriction condition 5:

min $$\sum_t^{K_n}\left(C_{EV,t}+C_{EV,t}^{feedback}-I_{DR,t}+c_{EV}^{deficiency}\right),$$

t∈ $K_n$ . . . , where $$C_{EV,t}=-p_{n,t}^{EV}\times C_t^{TOU}\times\Delta t,\text{ where } p_{n,t}^{EV}<0,$$

$$C_{EV,t}^{feedback}=p_{n,t}^{EV}\times C_{feedback}\times\Delta t,\text{ where } p_{n,t}^{EV}>0,$$

$$I_{DR,t}=p_{n,t}^{EV}\times C_{DR,t}\times\Delta t,\text{ where } p_{n,t}^{EV}>0,$$

and $$C_{EV,n}^{deficiency}=C_{EV}^{penalty}\times\left(E_{charge,n}^{EV}+\sum_t^{T_n}p_{n,t}^{EV}\times\Delta t\right),$$

where $$\left(E_{charge,n}^{EV}+\sum_t^{T_n}p_{n,t}^{EV}\times\Delta t\right)>0,$$

restriction condition 1:

$$\left|p_{n,t}^{EV}\right|\le P_n^{max},$$

restriction condition 2:

$$p_{EV,n,t}^{ch\_max}\le p_{n,t}^{EV}\le p_{EV,t}^{disch\_max},$$

restriction condition 3:

$$SOC_{EV,n}^{min}\le SOC_{n,t+1}^{EV}\le SOC_{EV,n}^{max},$$

restriction condition 4:

$$SOC_{n,t+1}^{EV}=SOC_{n,t}^{EV}-\begin{cases}\dfrac{p_{n,t}^{EV}\times\Delta t}{B_{Ev,n}^{cap}}, & \text{where } p_{n,t}^{EV}<0\\ \dfrac{p_{n,t}^{EV}\times\Delta t}{B_{Ev,n}^{cap}}, & \text{where } p_{n,t}^{EV}>0\end{cases},$$

and restriction condition 5:

$$SOC_{n,max(T_n)}^{EV}=SOC_{n,EV}^{final},$$

where $K_n$ is the serial number set of all the to-be-planned panes for the $n^{th}$ electric vehicle 15, $C_{EV,t}$ is the cost to be paid by the charging station 8 when the $n^{th}$ electric vehicle 15 is charged in the $t^{th}$ time pane, $$C_t^{TOU}$$

is the purchase price per unit electric power purchased by the charging station 8 in the $t^{th}$ time pane, $$p_{n,t}^{EV}$$

is the charging electric power or discharging electric power of the $n^{th}$ electric vehicle 15 in the $t^{th}$ time pane, $$p_{n,t}^{EV}$$

is the charging electric power of the $n^{th}$ electric vehicle 15 in the $t^{th}$ time pane when $$p_{n,t}^{EV}<0,\ p_{n,t}^{EV}$$

is the discharging electric power of the $n^{th}$ electric vehicle 15 in the $t^{th}$ time pane when $$p_{n,t}^{EV}>0,\ I_{t,n}^{DR}$$

is the electricity saving profit obtained by the charging station 8 when the $n^{th}$ electric vehicle 15 participates in the demand response in the $t^{th}$ time pane, $C_{DR,t}$ is the winning bid price paid by the charging station 8 for participating in the demand bidding in the $t^{th}$ time pane, $$C_{t,n}^{feedback}$$

is the compensation fee to be paid by the charging station 8 to the $n^{th}$ electric vehicle 15 when the electric vehicle 15 is discharged in the $t^{th}$ time pane, $C_{feedback}$ is the payment price per unit electric power that the charging station 8 pays in the $t^{th}$ time pane, $$C_{EV,n}^{deficiency}$$

is the penalty fee when the n$^{th}$ electric vehicle 15 does not meet the expected departure battery state of charge, $$C_{EV}^{penalty}$$

is the penalty price for not fully charging with the unit electric power, $$E_{charge}^{EV}$$

is the total amount of electricity that the n$^{th}$ electric vehicle 15 needs to obtain when the expected departure battery state of charge is met, $$p_n^{max}$$

is the maximum charging and discharging electric power that can be provided by the charging pile 11 corresponding to the n$^{th}$ electric vehicle 15, $$p_{EV,n,t}^{ch\_max}$$

is the maximum charging electric power of the n$^{th}$ electric vehicle 15, $$p_{EV,n,t}^{disch\_max}$$

is the maximum discharging electric power of the n$^{th}$ electric vehicle 15, $T_n$ is the serial number set of all time panes corresponding to the n$^{th}$ electric vehicle 15, $$SOC_{EV,n}^{min}$$

is the minimum battery state of charge of the n$^{th}$ electric vehicle 15, $$SOC_{EV,n}^{max}$$

is the maximum battery state of charge of the n$^{th}$ electric vehicle 15, $$SOC_{n,t+1}^{EV}$$

is one battery state of charge of the n$^{th}$ electric vehicle 15 in the t+1th time pane, $$B_{Ev,n}^{cap}$$

is the full charge capacity of the battery of the n$^{th}$ electric vehicle 15, $$SOC_n^{final}$$

is the departure battery state of charge of the n$^{th}$ electric vehicle 15, and $\Delta t$ is a time pane time period.

With reference to FIG. 1, FIG. 6, and FIG. 8, the electric energy storage device scheduling process of the electric vehicle charging station management method using the blockchain illustrates how to optimize the charging and discharging schedule corresponding to the electric energy storage device, and the following steps are included.

In step 61, the charging pile 11 corresponding to the electric energy storage device 14 treats all the time panes in the scheduling cycle as the time panes corresponding to the electric energy storage device 14, obtains at least one to-be-planned pane of the electric energy storage device from the time pane corresponding to the electric energy storage device 14, and writes the at least one to-be-planned pane into the distributed ledger 13 of the blockchain system 1. The at least one to-be-planned pane of the electric energy storage device 14 includes each time pane from the current time pane to the last time pane corresponding to the electric energy storage device 14. Since the electric energy storage device 14 is installed in the charging station 8, the time pane in which the electric energy storage device 14 is located is all the time panes in the scheduling cycle.

In step 62, according to the electric energy information corresponding to the electric energy storage device 14, the purchase price per unit electric power (i.e., the purchase price of 1 kWh of electricity) purchased by the charging station 8 in each to-be-planned pane of the electric energy storage device 14, the winning bid price (i.e., the winning bid price of 1 kWh) participating in the demand bidding, and a degradation cost (i.e., the degradation cost of charging and discharging 1 kWh of electricity) consumed by the electric energy storage device 14 for charging or discharging the unit electric power, the charging pile 11 corresponding to the electric energy storage device 14, by using a nonlinear programming model, obtains and writes the charging electric power or discharging electric power of the electric energy storage device 14 in each to-be-planned pane into the distributed ledger 13 of the blockchain system 1. The objective function of the nonlinear programming model can be expressed as the following formula (5), and the restriction conditions that the objective function satisfies are the following restriction condition 1 to restriction condition 4:

min $$\Sigma_t^{K_{ess}}\left(C_{ESS,t}+C_{ESS,t}^{deg}-I'_{DR,t}\right),$$

$t \in K_{ESS}$ . . . , where $$C_{ESS,t}=-p_{ESS,t}\times C_t^{TOU}\times\Delta t,$$

where $p_{ESS,t}<0$, $$C_{ESS,t}^{deg} = C_{ESS}^{bat}\left|\frac{m_{ESS}}{100}\right|\frac{|p_{ESS,t}| \times \Delta t}{B_{ESS}^{cap}},$$

$I_{DR,t}=p_{ESS,t}\times C_{DR,t}\times\Delta t$, where $p_{ESS,t}>0$, restriction condition 1:

$$|p_{ESS,t}| \le P_{ESS}^{max},$$

restriction condition 2:

$$SOC_{ESS}^{min} \le SOC_{ESS,t+1} \le SOC_{ESS}^{max},$$

restriction condition 3:

$$SOC_{ESS,t+1} = SOC_{ESS,t} - \begin{cases} \frac{p_{ESS,t} \times \Delta t}{B_{ESS}^{cap}}, \text{ where } p_{ESS,t} < 0 \\ \frac{p_{ESS,t} \times \Delta t}{B_{ESS}^{cap}}, \text{ where } p_{ESS,t} > 0 \end{cases},$$

and restriction condition 4:

$$SOC_{ESS}^{initial} = SOC_{ESS}^{final},$$

where $K_{ESS}$ is the serial number set of all to-be-planned panes of the electric energy storage device 14, $C_{ESS,t}$ is the cost to be paid by the charging station 8 when the electric energy storage device 14 is charged in the $t^{th}$ time pane, $I'_{DR,t}$ is the electricity saving profit obtained by the charging station 8 when the electric energy storage device 14 participates in the demand response in the $t^{th}$ time pane, $p_{ESS,t}$ is the charging electric power or the discharging electric power of the electric energy storage device 14 in the $t^{th}$ time pane, $$C_t^{TOU}$$

is the purchase price per unit electric power purchased by the charging station 8 in the $t^{th}$ time pane, $p_{ESS,t}$ is the charging electric power of the electric energy storage device 14 in the $t^{th}$ time pane when $p_{ESS,t}<0$, $p_{ESS,t}$ is the discharging electric power of the electric energy storage device 14 in the $t^{th}$ time pane when $p_{ESS,t}>0$, $$C_{ESS,t}^{deg}$$

is the total degradation cost of charging or discharging the electric energy storage device 14 in the $t^{th}$ time pane, $$C_{ESS}^{bat}$$

is the total cost of the electric energy storage device 14, $m_{ESS}$ is the ratio of the battery capacity change of the electric energy storage device 14 to the battery cycle number change, $$B_{ESS}^{cap}$$

is the full charge capacity of the electric energy storage device 14, $$C_{ESS}^{bat}\left|\frac{m_{ESS}}{100}\right|\frac{1}{B_{ESS}^{cap}}$$

is the degradation cost consumed per unit electric power by charging or discharging the battery of the electric energy storage device 14, $C_{DR,t}$ is the winning bid price paid by the charging station 8 participating in the demand bidding in the $t^{th}$ time pane, $$P_{ESS}^{max}$$

is the maximum charging and discharging electric power of the electric energy storage device 14, $$SOC_{ESS}^{min}$$

is the minimum battery state of charge of the electric energy storage device 14, $$SOC_{ESS}^{max}$$

is the maximum battery state of charge of the electric energy storage device 14, $SOC_{ESS,t+1}$ is the battery state of charge of the electric energy storage device 14 in the $t+1^{th}$ time pane, $$SOC_{ess}^{initial}$$

is the entry battery state of charge of the electric energy storage device 14, $$SOC_{ess}^{final}$$

is the departure battery state of charge of the electric energy storage device 14, and $\Delta t$ is the time period corresponding to each time pane.

With reference to FIG. 1, FIG. 7, and FIG. 8, the comprehensive planning process of the electric vehicle charging station management method using the blockchain illustrates how to avoid the lack of holistic consideration due to independent scheduling, which leads to violation of the maximum supplied electric power limit in some specific cases. The comprehensive planning process includes the following steps.

In step 71, for each time pane from the current time pane to the last time pane of all time panes of the scheduling cycle (i.e., all to-be-planned panes of the electric energy storage device 14), according to the predicted solar electric power and predicted load power consumption electric power of the charging station 8 in each time pane, the charging electric power or discharging electric power of each electric vehicle 15 in the corresponding time pane obtained from the distributed ledger 13, and the charging electric power or discharging electric power of the electric energy storage device 14 obtained from the distributed ledger 13 in the corresponding time pane, the server 12, through the smart contract 121, obtains the total consumed electric power of the charging station 8 in each time pane from the current time pane to the last time pane of the scheduling cycle. For the $t^{th}$ time pane of the $n^{th}$ electric vehicle 15, the total consumed electric power $P_{sum,t}$ is calculated through the following formula (6): $P_{sum,t}-p_{load,t}-p_{ESS,t}-p_{pv,t}-$ $$\Sigma_n^N p_{n,t}^{EV},\ t \in K_{ESS} \tag{6}$$

where $$p_{n,t}^{EV}$$

is the charging electric power or the discharging electric power of the $n^{th}$ electric vehicle 15 in the $t^{th}$ time pane, $p_{ESS,t}$ is the charging electric power or the discharging electric power of the electric energy storage device 14 in the $t^{th}$ time pane, $p_{load,t}$ is the predicted load power consumption electric power of the charging station 8 in the $t^{th}$ time pane, $p_{pv,t}$ is the predicted solar electric power of the charging station 8 in the $t^{th}$ time pane, N is the number of all electric vehicles 15, and $K_{ESS}$ is the serial number set of all to-be-planned panes of the electric energy storage device 14.

In step 72, the server 12, through the smart contract 121, determines whether at least one overloaded pane is provided from the current time pane to the last time pane of the scheduling cycle according to the total consumed electric power of each time pane obtained in the 72 and the maximum supplied electric power of the charging station 8. The total consumed electric power of each overloaded pane is greater than the maximum supplied electric power of the charging station 8. Step 73 is performed when the server 12 determines that the at least one overloaded pane is provided, and step 74 is provided when the server 12 determines that no overloaded pane is provided.

In step 73, the server 12, through the smart contract 121, adjusts the purchase price of each overloaded pane according to an electricity price adjustment coefficient $f_t(x)$ corresponding to the overloaded pane, and step 52, step 62, and steps 71 to 72 are then repeated. Each electricity price adjustment coefficient $f_t(x)$ may be expressed as the following formula (7):

$$f_t(x) = \frac{p_{load,t} - p_{ESS,t} - p_{pv,t} - \sum_n^N p_{n,t}^{EV}}{P_{tr}^{max}},\ t \in T_{overlaod}, \tag{7}$$

where $$p_{n,t}^{EV}$$

is the charging electric power or the discharging electric power of the $n^{th}$ electric vehicle 15 in the $t^{th}$ time pane, $p_{ESS,t}$ is the charging electric power or the discharging electric power of the electric energy storage device 14 in the $t^{th}$ time pane, $p_{load,t}$ is the predicted load power consumption electric power of the charging station 8 in the $t^{th}$ time pane, $p_{pv,t}$ is the predicted solar electric power of the charging station 8 in the $t^{th}$ time pane, N is the number of all electric vehicles 15, $$P_{tr}^{max}$$

is the maximum supplied electric power, and $T_{overlaod}$ is the serial number set of all overloaded panes.

In this embodiment, the server 12 adjusts the purchase price of the overloaded pane by multiplying the original purchase price of the overloaded pane by the electricity price adjustment coefficient corresponding to the overloaded pane, so that the electricity price of the overloaded pane is increased. In step 52 which is performed again, the purchase price per unit electric power purchased by the charging station 8 in the corresponding to-be-planned pane of the electric vehicle 15 is the adjusted electricity price. Similarly, the purchase price per unit electric power purchased by the charging station 8 in the corresponding to-be-planned pane of the electric energy storage device 14 is the adjusted electricity price. By increasing the electricity price of the overloaded pane, the profit of the charging station 8 may be optimized, and the charging amount in the overloaded pane may be transferred to other to-be-planned panes whose electricity price has not been increased. In this way, the overload problem that may occur when each electric vehicle 15 is independently planned may be compensated by the comprehensive planning process, so that the limit of the maximum supplied electric power may not be violated in any time pane.

It is also worth mentioning that the range of t in formula (6) may also be defined as a serial number set of all time panes in the scheduling cycle. In the electric vehicle charging station management method using the blockchain provided by the disclosure, after the electric vehicle distributed scheduling process and the electric energy storage device 14 scheduling process are performed each time, the comprehensive planning process is performed, so that the planned scheduling result may not violate the limit of the maximum supplied electric power in any time pane. Therefore, the previously planned time panes must all meet the limit of not greater than the maximum supplied electric power, so that it does not matter even if the previously planned time panes are included in the consideration of whether any overloaded pane is provided.

In step 74, the server 12, through the smart contract 121, writes the charging electric power or discharging electric power of each electric vehicle 15 and the electric energy storage device 14 in each of the corresponding planned to-be-planned panes without any overloaded pane into the distributed ledger 13 of the blockchain system 1.

In step 75, each of the charging piles 11, from the distributed ledger 13 of the blockchain system 1, obtains the planned charging electric power or discharging electric power of each electric vehicle 15 in each of the to-beplanned panes without any overloaded pane and the planned charging electric power or discharging electric power of the electric energy storage device 14 in each of the to-be-planned panes without any overloaded pane, and according to the obtained charging electric power or discharging electric power of each electric vehicle 15 and the electric energy storage device 14 in each corresponding time pane, controls the charging station 8 to charge or discharge each electric vehicle 15 and the electric energy storage device 14 in the current time pane according to the charging electric power or discharging electric power corresponding to each electric vehicle 15 and the electric energy storage device 14 in the current time pane.

In step 76, the server 12, through the smart contract 121, determines whether the current time pane is the last time pane of the scheduling cycle. When the server 12 determines that the current time pane is the last time pane of the scheduling cycle, the process ends. When the server 12 determines that the current time pane is not the last time pane of the scheduling cycle, the process proceeds to step 77.

In step 77, when the time passes to the next time pane of the current time pane (i.e., the next time pane becomes the new current time pane), the server 12 re-executes steps 21 to 22, 31 to 32, 41 to 43, 51 to 52, 62, and 71 to 76. It is worth noting that if a new electric vehicle is parked in the charging station 8 in the next time pane, when step 41 is performed again, it is only necessary to map the entry time and departure time of the electric vehicle newly added to the charging station 8 into the scheduling cycle, and the previously mapped electric vehicle does not need to be mapped again.

The following example illustrates the operation of the electric vehicle charging station management method using the blockchain provided by the disclosure. If the scheduling cycle is one day, one day includes 0 to 95 time panes. When the current time pane is today's $0^{th}$ time pane, if a power generation prediction process and a electricity consumption prediction process are to be performed, the predicted solar electric power corresponding to each time pane of the $0^{th}$ time pane to the $95^{th}$ time pane of today is to be predicted according to the solar power correspondingly generated by each time pane of the $0^{th}$ time pane to the $95^{th}$ time pane of the previous day and the weather information corresponding to the current scheduling cycle. Next, the predicted load power consumption electric power corresponding to each time pane of the $0^{th}$ time pane to the $95^{th}$ time pane of today is to be predicted according to the consumed load power consumption electric power corresponding to each time pane of the $0^{th}$ time pane to the $95^{th}$ time pane of the previous day and the weather information corresponding to the current scheduling cycle. When a charging and discharging allocation process is performed, assuming that there are 3 electric vehicles 15 parked at the charging station 8 in the $0^{th}$ time pane, and the first electric vehicle 15 is mapped to the $0^{th}$ to $3^{rd}$ time panes among the $0^{th}$ to $95^{th}$ time panes, the second electric vehicle 15 is mapped to the $0^{th}$ to $5^{th}$ time panes among the $0^{th}$ to $95^{th}$ time panes, and the third electric vehicle 15 is mapped to the $0^{th}$ to $8^{th}$ time panes among the $0^{th}$ to $95^{th}$ time panes. When the current time pane is the $0^{th}$ time pane, then at least one to-be-planned pane of the first electric vehicle 15 is the $0^{th}$ to $3^{rd}$ time panes, represented by [0, 1, 2, 3], the at least one to-be-planned pane of the second electric vehicle 15 is [0, 1, 2, 3, 4, 5], and the at least one to-be-planned pane of the third electric vehicle 15 is [0,1, 2,3,4,5,6,7,8]. Next, the maximum charging electric power and the maximum discharging electric power of each electric vehicle 15 in each corresponding to-be-planned pane are obtained. Next, the electric vehicle distributed scheduling procedure is performed to obtain the charging electric power or discharging electric power of the first electric vehicle 15 in each to-be-planned pane (i.e., each of the $0^{th}$ to $3^{rd}$ time panes), the charging electric power or discharging electric power of the second electric vehicle 15 in each to-be-planned pane (i.e., each of the $0^{th}$ to $5^{th}$ time panes), and the charging electric power or discharging electric power of the third electric vehicle 15 in each to-be-planned pane (i.e., each of the $0^{th}$ to $8^{th}$ time panes). Next, the electric energy storage device 14 scheduling procedure is performed to obtain the charging electric power or discharging electric power of the electric energy storage device 14 in each to-be-planned pane (i.e., each of the $0^{th}$ to $95^{th}$ time panes). Finally, the comprehensive planning process is performed to determine whether at least one overloaded pane is provided among the $0^{th}$ to $95^{th}$ time panes. Assuming that the server 12 determines that the $2^{nd}$ to $3^{rd}$ time panes among the $0^{th}$ to $95^{th}$ time panes are overloaded panes, the server 12 may then adjust the purchase price of the overloaded panes (i.e., the $2^{nd}$ to $3^{rd}$ time panes, represented by [2, 3]) and re-plans the charging and discharging of each electric vehicle 15 and the electric energy storage device 14 until no overloaded pane is provided among the $0^{th}$ to $95^{th}$ time panes. Next, each of the charging piles 11, according to the planned charging electric power or discharging electric power of the first electric vehicle 15 in each of the $0^{th}$ to $3^{rd}$ time panes without any overloaded pane, the charging electric power or discharging electric power of the second electric vehicle 15 in each of the $0^{th}$ to $5^{th}$ time panes, the charging electric power or the discharging electric power of the third electric vehicle 15 in each of the $0^{th}$ to $8^{th}$ time panes, and the charging electric power or discharging electric power of the electric energy storage device 14 in each time pane of the $0^{th}$ to $95^{th}$ time panes, controls the charging station 8 to charge or discharge each electric vehicle 15 and the electric energy storage device 14 in the current time pane (i.e., the $0^{th}$ time pane) according to the charging electric power or discharging electric power corresponding to each electric vehicle 15 and the electric energy storage device 14 in the $0^{th}$ time pane.

When the time passes to the $1^{st}$ time pane (i.e., the $1^{st}$ time pane becomes the new current time pane), when the power generation prediction process and the power consumption prediction process are performed, the predicted solar electric power corresponding to each time pane of the $1^{st}$ to $95^{th}$ time panes of today and the $0^{th}$ time pane of tomorrow is predicted according to the solar electric power correspondingly generated by each time pane of the $1^{st}$ to $95^{th}$ time pane of the previous day and the $0^{th}$ time pane of today and the weather information of the corresponding scheduling cycle. Next, the predicted load power consumption electric power corresponding to each time pane of the $1^{st}$ to $95^{th}$ time panes of today and the $0^{th}$ time pane of tomorrow is predicted according to the consumed load power consumption electric power corresponding to each time pane of the $1^{st}$ to $95^{th}$ time panes of the previous day and the $0^{th}$ time pane of today and the weather information corresponding to the scheduling cycle. When the charging and discharging allocation process is performed, the at least one to-be-planned pane of the first electric vehicle 15 is changed to the $1^{st}$ to $3^{rd}$ time panes, which are represented by [1, 2, 3], the at least one to-be-planned pane of the second electric vehicle 15 is changed to [1,2,3,4,5], and the at least one to-be-planned pane of the third electric vehicle 15 is changed to [1,2,3,4,5,6,7,8]. Next, the maximum charging electric power and the maximum discharging electric power of each electric vehicle 15 in each corresponding to-be-planned pane are obtained. Next, the electric vehicle distributed scheduling procedure is performed to obtain the charging electric power or discharging electric power of the first electric vehicle 15 in each to-be-planned pane (i.e., each of the $1^{st}$ to $3^{rd}$ time panes), the charging electric power or discharging electric power of the second electric vehicle 15 in each to-be-planned pane (i.e., each of the $1^{st}$ to $5^{th}$ time panes), and the charging electric power or discharging electric power of the third electric vehicle 15 in each to-be-planned pane (i.e., each of the $1^{st}$ to $8^{th}$ time panes). Next, the electric energy storage device 14 scheduling process is performed to obtain the charging electric power or discharging electric power of the electric energy storage device 14 in each to-be-planned pane (i.e., each of the $1^{st}$ to $95^{th}$ time panes). Finally, the comprehensive planning process is performed to determine whether at least one overloaded pane is provided among the $1^{st}$ to $95^{th}$ time panes. Assuming that the server 12 determines that no overloaded pane is provided in the $1^{st}$ to $95^{th}$ time panes, each of the charging piles 11, according to the planned charging electric power or discharging electric power of the first electric vehicle 15 in time pane of the $1^{st}$ to $3^{rd}$ time panes without any overloaded pane, the charging electric power or discharging electric power of the second electric vehicle 15 in each of the $1^{st}$ to $5^{th}$ time panes, the charging electric power or the discharging electric power of the third electric vehicle 15 in each of the $1^{st}$ to $8^{th}$ time panes, and the charging electric power or discharging electric power of the electric energy storage device 14 in each of the $1^{st}$ to $95^{th}$ time panes, controls the charging station 8 to charge or discharge each electric vehicle 15 and the electric energy storage device 14 in the current time pane (i.e., the $1^{st}$ time pane) according to the charging electric power or discharging electric power corresponding to each electric vehicle 15 and the electric energy storage device 14 in the $1^{st}$ time pane.

In view of the foregoing, the electric vehicle charging station management method using the blockchain provided by the disclosure exhibits the following effects.

First, by distributedly planning the charging electric power or discharging electric power of each electric vehicle in each of the corresponding to-be-planned panes, the computational dimension may be greatly reduced.

Second, by writing the charging electric power or discharging electric power of each electric vehicle corresponding to each to-be-planned pane obtained by the electric vehicle distributed scheduling process into the distributed ledger 13, it can be ensured that the scheduling method is transparent, and the charging and discharging of each electric vehicle can be managed according to the planned scheduling result.

Third, by performing a comprehensive planning process, the planned scheduling results may not violate the limit of the maximum supplied electric power in any time pane, so the purpose of the disclosure can indeed be achieved.

The above description presents merely embodiments of the disclosure and should not be used to limit the scope of implementation of the disclosure. All simple equivalent changes and modifications made according to the scope of the patent application of the disclosure and the content of the patent specification are still within the scope of the patent of the disclosure.

What is claimed is:

1. An electric vehicle charging station management method using a blockchain, wherein charging and discharging management of a plurality of electric vehicles parked at a charging station is implemented by using a blockchain system, the blockchain system comprises a server and a plurality of charging piles disposed in the charging station and in communication with the server, each electric vehicle corresponds to a piece of electric vehicle information stored in a distributed ledger of the blockchain system and is electrically connected to a corresponding one of the plurality of charging piles, and the electric vehicle information comprises entry time, departure time, a battery state of charge at a time of entry, a current battery state of charge, an expected departure battery state of charge, a minimum battery state of charge, a maximum battery state of charge, and a full charge capacity of the electric vehicle, the electric vehicle charging station management method using the blockchain specifically comprises the following steps:

(A) mapping the entry time and departure time of each electric vehicle to a corresponding time pane in a scheduling cycle, obtaining at least one time pane corresponding to the electric vehicle, obtaining at least one to-be-planned pane of the electric vehicle from the at least one time pane, and writing the at least one to-be-planned pane into the distributed ledger of the blockchain system, wherein the at least one to-be-planned pane comprises each time pane from a current time pane to a last time pane corresponding to the electric vehicle;

(B) obtaining a charging priority weight and a discharging priority weight of each electric vehicle in each to-be-planned pane according to a current time, the departure time of the electric vehicle, the current battery state of charge, the departure battery state of charge, the full charge capacity, and a maximum charging and discharging electric power provided by one of the plurality of the charging piles corresponding to the electric vehicle;

(C) obtaining and writing a maximum charging electric power and a maximum discharging electric power of each electric vehicle in each to-be-planned pane into the distributed ledger in the blockchain system according to a maximum power of a transformer of the charging station and the charging priority weight and the discharging priority weight of the electric vehicle in each to-be-planned pane;

(D) obtaining and writing, by using a nonlinear programming model, a charging electric power or discharging electric power of each electric vehicle in each to-be-planned pane into the distributed ledger of the blockchain system according to the electric vehicle information of the electric vehicle, at least one purchase price per unit electric power purchased by the charging station in each to-be-planned pane, at least one winning bid price paid by the charging station for participating in demand bidding in each to-be-planned pane, a payment price per unit electric power paid by the charging station in each to-be-planned pane, a penalty price per unit electric power paid by the charging station when the electric vehicle is not fully charged, and the maximum charging electric power and the maximum discharging electric power of the electric vehicle in each to-be-planned pane;

(E) obtaining a total consumed electric power of the charging station in each time pane from the current time pane to the last time pane of the scheduling cycle according to the charging electric power or discharging electric power of each electric vehicle in each to-be-planned pane;

(F) determining whether at least one overloaded pane is provided from the current time pane to the last time pane of the scheduling cycle according to the total consumed electric power of each time pane obtained in step (E) and a maximum supplied electric power of the charging station, wherein the total consumed electric power of the at least one overloaded pane is greater than the maximum supplied electric power of the charging station; and (G) adjusting the purchase price of each of the at least one overloaded pane when it is determined that the at least one overloaded pane is provided, repeating steps (D) to (F) and at least part of step (G) until it is determined that no overloaded pane is provided, and writing a currently obtained charging electric power or discharging electric power of each electric vehicle in each to-be-planned pane into the distributed ledger of the blockchain system, and controlling the charging station to charge or discharge each electric vehicle in the current time pane according to the currently obtained charging electric power or discharging electric power corresponding to each electric vehicle in the current time pane.

2. The electric vehicle charging station management method using the blockchain according to claim 1, wherein in step (D), the objective function of the nonlinear programming model is expressed as:

min $$\Sigma_t^{K_n}\left(C_{EV,t,n}+C_{EV,t,n}^{feedback}-I_{t,n}^{DR}+C_{EV,n}^{deficiency}\right),$$

$t \in K_n$, $C_{EV,t,n}=$ $$-p_{n,t}^{EV}\times C_t^{TOU}$$

$\times\Delta t$, where $$p_{n,t}^{EV}$$

<0, $$C_{E,V,t,n}^{feedback}=p_{n,t}^{EV}$$

$\times C_{feedback,t}\times\Delta t$, where $$p_{n,t}^{EV}$$

>0, $$I_{t,n}^{DR}=p_{n,t}^{EV}$$

$\times C_{DR,t}\times\Delta t$, where $$p_{n,t}^{EV}$$

>0, and $$C_{EV,n}^{deficiency}=C_{EV}^{penalty}\times\left(E_{charge,n}^{EV}+\Sigma_t^{T_n}p_{n,t}^{EV}\times\Delta t\right),$$

where $$E_{charge,n}^{EV}+\Sigma_t^{T_n}p_{n,t}^{EV}$$

$\times\Delta t>0$, objective function constraints are as follows:

restriction condition 1:

$$\left|p_{n,t}^{EV}\right|\le P_n^{max},$$

restriction condition 2:

$$p_{EV,n,t}^{ch\_max}\le p_{n,t}^{EV}\le p_{EV,n,t}^{disch\_max},$$

restriction condition 3:

$$SOC_{EV,n}^{min}\le SOC_{n,t+1}^{EV}\le SOC_{EV,n}^{max},$$

restriction condition 4:

$$SOC_{n,t+1}^{EV}=SOC_{n,t}^{EV}-\frac{P_{n,t}^{EV}\times\Delta t}{B_{Ev,n}^{cap}},\text{ where }P_{n,t}^{EV}\neq 0$$

and restriction condition 5:

$$SOC_{n,max(T_n)}^{EV}=SOC_{n,EV}^{final},$$

where $K_n$ is a serial number set of all the to-be-planned panes for a $n^{th}$ electric vehicle, $C_{EV,t,n}$ is the cost to be paid by the charging station when the $n^{th}$ electric vehicle is charged in a $t^{th}$ time pane, $$C_t^{TOU}$$

is a purchase price per unit electric power purchased by the charging station in the $t^{th}$ time pane, $$p_{n,t}^{EV}$$

is a charging electric power or discharging electric power of the $n^{th}$ electric vehicle in the $t^{th}$ time pane when $$p_{n,t}^{EV}$$

<0, or $$p_{n,t}^{EV}$$

is a discharging electric power of the $n^{th}$ electric vehicle in the $t^{th}$ time pane when $$p_{n,t}^{EV}$$

<0, $$I_{t,n}^{DR}$$

is the electricity saving profit obtained by the charging station when the $n^{th}$ electric vehicle participates in the demand response in the $t^{th}$ time pane, $C_{DR,t}$ is a winning bid price at which the charging station participates in the demand bidding in the $t^{th}$ time pane, $$C_{EV,t,n}^{feedback}$$

is a compensation fee to be paid by the charging station to the $n^{th}$ electric vehicle when the electric vehicle is discharged in the $t^{th}$ time pane, $C_{feedback,t}$ is a payment price per unit electric power that the charging station pays in the $t^{th}$ time pane, $$C_{EV,n}^{deficiency}$$

is the penalty fee when the $n^{th}$ electric vehicle does not meet the expected departure penalty battery state of charge, $$C_{EV}^{penalty}$$

is the penalty price per unit electric power for not fully charging, $$E_{charge,n}^{EV}$$

is a total amount of electricity that the $n^{th}$ electric vehicle needs to obtain when the expected departure battery state of charge is met, $$p_n^{max}$$

is a maximum charging and discharging electric power that can be provided by the charging pile corresponding to the $n^{th}$ electric vehicle, $$p_{EV,n,t}^{ch\_max}$$

is a maximum charging electric power of the $n^{th}$ electric vehicle, $$p_{EV,n,t}^{disch\_max}$$

is a maximum discharging electric power of the $n^{th}$ electric vehicle, $T_n$ is a serial number set of all time panes corresponding to the $n^{th}$ electric vehicle, $$SOC_{EV,n}^{min}$$

is a minimum battery state of charge of the $n^{th}$ electric vehicle, $$SOC_{EV,n}^{max}$$

is a maximum battery state of charge of the $n^{th}$ electric vehicle, $$SOC_{n,t+1}^{EV}$$

is a battery state of charge of the $n^{th}$ electric vehicle in a $t+1^{th}$ time pane, $$SOC_{n,max(T_n)}^{EV}$$

is a battery state of charge of the $n^{th}$ electric vehicle in a max $(T_n)^{th}$ time pane, $$B_{Ev,n}^{cap}$$

is a full charge capacity of the battery of the $n^{th}$ electric vehicle, $$SOC_{n,EV}^{final}$$

is a departure battery state of charge of the $n^{th}$ electric vehicle, and $\Delta t$ is a time pane time.

3. The electric vehicle charging station management method using the blockchain according to claim 1, further comprising: (H) writing a demand response event comprising a demand response period and a corresponding winning bid price thereof into the distributed ledger of the blockchain system, wherein step (H) is performed before step (D).

4. The electric vehicle charging station management method using the blockchain according to claim 1, wherein the charging station is provided with an electric energy storage device, the electric energy storage device corresponds to electric energy information stored in the distributed ledger of the blockchain system and is electrically connected to a corresponding one of the plurality of charging piles, the electric energy information comprises an entry battery state of charge, a current battery state of charge, a minimum state of charge, a maximum state of charge, a full charge capacity, and a maximum charging and discharging electric power of the electric energy storage device, and before step (E) is performed, the electric vehicle charging station management method using the blockchain further comprises the following steps:

(I) treating all the time panes of the scheduling cycle as the time panes corresponding to the electric energy storage device, obtaining at least one to-be-planned pane of the electric energy storage device from the time pane corresponding to the electric energy storage device, and writing the at least one to-be-planned pane into the distributed ledger of the blockchain system, wherein the at least one to-be-planned pane of the electric energy storage device comprises each time pane from the current time pane to the last time pane corresponding to the electric energy storage device; and (J) obtaining and writing, by using a nonlinear programming model, a charging electric power or discharging electric power of the electric energy storage device in each to-be-planned pane into the distributed ledger of the blockchain system according to the electric energy information corresponding to the electric energy storage device, a purchase price per unit electric power purchased by the charging station in each to-be-planned pane of the electric energy storage device, a winning bid price participating in the demand bidding, and a degradation cost consumed per unit electric power to charge or discharge the electric energy storage device, wherein in step (E), the total consumed electric power of the charging station in each time pane from the current time pane to the last time pane of the scheduling cycle is obtained not only according to the charging electric power or discharging electric power of each electric vehicle in each to-be-planned pane but also the charging electric power or discharging electric power of the electric energy storage device in each to-be-planned pane.

5. The electric vehicle charging station management method using the blockchain according to claim 4, wherein the charging station is also provided with a solar module for generating electricity and a plurality of loads, and before step (E) is performed, the electric vehicle charging station management method further comprises:

(K) predicting, by using a power generation prediction model, a predicted solar electric power corresponding to the solar module in each time pane of the scheduling cycle according to a solar electric power generated by the solar module in each time pane of a previous scheduling cycle of the scheduling cycle and weather information corresponding to the scheduling cycle; and (L) predicting, by using an electricity consumption prediction model, a predicted load power consumption electric power corresponding to the loads of the charging station in each time pane of the scheduling cycle according to a load power consumption electric power correspondingly consumed by the loads of the charging station in each time pane of the previous scheduling cycle and the weather information corresponding to the scheduling cycle, wherein in step (E), the total consumed electric power of the charging station in each time pane from the current time pane to the last time pane of the scheduling cycle is obtained not only according to the charging electric power or discharging electric power of each electric vehicle in each to-be-planned pane, the charging electric power or discharging electric power of the electric energy storage device in each to-be-planned pane, but also the predicted solar electric power and the predicted load power consumption electric power of each time pane of the scheduling cycle.

6. The electric vehicle charging station management method using the blockchain according to claim 5, wherein in step (C), the maximum charging electric power and the maximum discharging electric power of each electric vehicle in each to-be-planned pane are obtained not only according to the maximum power of the transformer of the charging station and the charging priority weight and the discharging priority weight of the electric vehicle but also the predicted solar electric power and the predicted load power consumption electric power corresponding to each time pane of the scheduling cycle.

7. The electric vehicle charging station management method using the blockchain according to claim 6, wherein in step (C), according to the charging priority weight $$pri_{t,n}^{ch}$$

of the n$^{th}$ electric vehicle, the charging priority weight of all electric vehicles, the discharging priority weight $$pri_{t,n}^{disch}$$

of the n$^{th}$ electric vehicle, the discharging priority weight of all electric vehicles, the maximum power $$P_{tr}^{max}$$

of the transformer of the charging station, the predicted solar electric power $p_{pv,t}$ in the t$^{th}$ time pane, and the predicted load power consumption electric power $p_{load,t}$ in the t$^{th}$ time pane, the maximum charging electric power $$p_{EV,n,t}^{ch\_max}$$

and the maximum discharging electric power $$p_{EV,n,t}^{disch\_max}$$

of the n$^{th}$ electric vehicle in the t$^{th}$ time pane are obtained through the following formulas:

$$p_{EV,n,t}^{ch\_max} = (-P_{tr}^{max} + p_{load,t} - p_{pv,t}) \times \frac{pri_{t,n}^{ch}}{\sum_{n}^{N} pri_{t,n}^{ch}}$$

and $$p_{EV,n,t}^{disch\_max} = (P_{tr}^{max} + p_{load,t} - p_{pv,t}) \times \frac{prt_{t,n}^{disch}}{\sum_n^N prt_{t,n}^{disch}}$$

where N is a number of all electric vehicles.

8. The electric vehicle charging station management method using the blockchain according to claim 4, wherein in step (E), according to the charging electric power or the discharging electric power $$p_{n,t}^{EV}$$

of the $n^{th}$ electric vehicle in a $t^{th}$ time pane, the charging electric power or the discharging electric power $p_{ESS,t}$ of the electric energy storage device in the $t^{th}$ time pane, a predicted load power consumption electric power $p_{load,t}$ of the charging station in the $t^{th}$ time pane, and the predicted solar electric power $p_{pv,t}$ in the $t^{th}$ time pane, the total consumed electric power $P_{sum,t}$ of the charging station in the $t^{th}$ time pane is obtained through the following formula:

$P_{sum,t}=p_{load,t}-p_{ESS,t}-p_{pv,t}-$ $$\sum_n^N p_{n,t}^{EV},$$

$t \in K_{ESS}$, where N is a number of all electric vehicles, and $K_{ESS}$ is a serial number set of all to-be-planned panes of the electric energy storage device, and in step (G), for each of the at least one overloaded pane, the purchase price of the at least one overloaded pane is adjusted according to an electricity price adjustment coefficient $f_t(x)$ corresponding to the at least one overloaded pane, $$f_t(x) = \frac{P_{load,t} - P_{ESS,t} - P_{pv,t} - \sum_n^N P_{n,t}^{EV}}{P_{tr}^{max}}, \ t \in T_{overload},$$

where $$P_{tr}^{max}$$

is the maximum supplied electric power, and $T_{overload}$ is a serial number set of all overloaded panes.

9. The electric vehicle charging station management method using the blockchain according to claim 4, wherein in step (J), an objective function of the nonlinear programming model is expressed as:

min $$\sum_t^{K_{ESS}}$$

$(C_{ESS,t}+$ $$C_{ESS,t}^{deg}$$

$-I'_{DR,t}), t \in K_{ESS}$, $C_{ESS,t}=-p_{ESS,t}\times$ $$C_t^{TOU}$$

$\times \Delta t$, where $p_{ESS,t}<0$, $$C_{ESS,t}^{deg} = C_{ESS}^{bat}\left|\frac{m_{ESS}}{100}\right|\frac{|P_{ESS,t}| \times \Delta t}{B_{ESS}^{cap}},$$

and $I'_{DR,t}=p_{ESS,t}\times C_{DR,t}\times \Delta t$, where $p_{ESS,t}>0$, objective function constraints are as follows:

restriction condition 1: $|p_{ESS,t}| \leq$ $$P_{ESS}^{max},$$

restriction condition 2:

$$SOC_{ESS}^{min}$$

$\leq SOC_{ESS,t+1} \leq$ $$SOC_{ESS}^{max},$$

restriction condition 3:

$$SOC_{ESS,t+1} = SOC_{ESS,t} - \frac{P_{ESS,t} \times \Delta t}{B_{ESS}^{cap}}, \text{ where } P_{ESS,t} \neq 0$$

, and restriction condition 4:

$$SOC_{ess}^{initial} = SOC_{ess}^{final},$$

where $K_{ESS}$ is a serial number set of all to-be-planned panes of the electric energy storage device, $C_{ESS,t}$ is a cost to be paid by the charging station when the electric energy storage device is charged in a $t^{th}$ time pane, $I'_{DR,t}$ is an electricity saving profit obtained by the charging station when the electric energy storage device participates in a demand response in the $t^{th}$ time pane, $$C_t^{TOU}$$

is a purchase price per unit electric power purchased by the charging station in the $t^{th}$ time pane, $p_{ESS,t}$ is a charging electric power of a electric energy storage device in the $t^{th}$ time pane when $p_{ESS,t}<0$, $p_{ESS,t}$ is a discharging electric power of the electric energy storage device in the $t^{th}$ time pane when $p_{ESS,t}>0$, $$C_{ESS,t}^{deg}$$

is a total degradation cost of charging or discharging the electric energy storage device in the $t^{th}$ time pane, $$C_{ESS}^{bat}$$

is a total cost of the electric energy storage device, $m_{ESS}$ is a ratio of the battery capacity change of the electric energy storage device to a battery cycle number change, $$B_{ESS}^{cap}$$

is the full charge capacity of the electric energy storage device, $$C_{ESS}^{bat}\left|\frac{m_{ESS}}{100}\right|\frac{1}{B_{ESS}^{cap}}$$

is the degradation cost consumed per unit electric power to charge or discharge the battery of the electric energy storage device, $C_{DR,t}$ is the winning bid price at which the charging station for participates in the demand bidding in the $t^{th}$ time pane, $$P_{ESS}^{max}$$

is a maximum charging and discharging electric power of the electric energy storage device, $$SOC_{ESS}^{min}$$

is a minimum battery state of charge of the electric energy storage device, $$SOC_{ESS}^{max}$$

is a maximum battery state of charge of the electric energy storage device, $SOC_{ESS,t+1}$ is a battery state of charge of the electric energy storage device in a $t+1^{th}$ time pane, $$SOC_{ess}^{inital}$$

is an entry battery state of charge of the electric energy storage device, $$SOC_{ess}^{final}$$

is a departure battery state of charge of the electric energy storage device, and $\Delta t$ is a time period corresponding to each time pane.

10. The electric vehicle charging station management method using the blockchain according to claim 1, wherein in step (B), according to the current time $t^{current}$ the departure time $$t_n^{dep}$$

corresponding to the $n^{th}$ electric vehicle, the current battery state of charge $$SOC_n^{current},$$

the departure battery state of charge $$SOC_n^{final},$$

the full charge capacity $$B_n^{cap},$$

and the maximum charging and discharging electric power $$P_n^{max}$$

provided by the charging pile corresponding to the electric vehicle, the charging priority weight $$pri_{t,n}^{ch}$$

and discharging priority weight $$pri_{t,n}^{disch}$$

of the $n^{th}$ electric vehicle are obtained through the following formulas:

$$pri_{t,n}^{ch}=\frac{\left(SOC_n^{final}-SOC_n^{current}\right)\times B_n^{cap}}{\left(t_n^{dep}-t^{current}+1\right)\times\Delta t\times P_n^{max}}$$

and $$pri_{t,n}^{disch}=\frac{1}{pri_{t,n}^{ch}},$$

where $\Delta t$ is a time period corresponding to each time pane.

* * * * *